United States Patent [19]

Chien

[11] Patent Number: 5,089,460
[45] Date of Patent: Feb. 18, 1992

[54] VANADIUM CATALYST SYSTEMS FOR OLEFIN POLYMERIZATION

[75] Inventor: James C. W. Chien, Amherst, Mass.

[73] Assignee: Academy of Applied Science, Inc., Concord, N.H.; a part interest

[21] Appl. No.: 665,911

[22] Filed: Mar. 1, 1991

Related U.S. Application Data

[63] Continuation of Ser. No. 385,665, Jul. 26, 1989, abandoned.

[51] Int. Cl.$^5$ ............................................. C08F 4/68
[52] U.S. Cl. .................................... 502/112; 502/121; 502/122; 502/123; 502/124; 502/125; 502/126; 502/127; 526/125
[58] Field of Search ............... 502/112, 121, 122, 123, 502/124, 125, 126, 127

[56] References Cited

U.S. PATENT DOCUMENTS

| | | | |
|---|---|---|---|
| 4,465,785 | 8/1984 | Kelland | 502/127 X |
| 4,471,066 | 9/1984 | Sakurai et al. | 502/125 X |
| 4,483,939 | 11/1984 | Baba et al. | 502/127 X |
| 4,529,716 | 7/1985 | Banzi et al. | 502/121 |
| 4,562,173 | 12/1985 | Terano et al. | 502/127 |
| 4,761,461 | 8/1988 | Jaggard et al. | 502/127 X |
| 4,829,037 | 5/1989 | Terano et al. | 502/112 |
| 4,857,613 | 8/1989 | Zolk et al. | 502/127 X |

Primary Examiner—Patrick P. Garvin
Attorney, Agent, or Firm—Rines and Rines

[57] ABSTRACT

A catalyst system for the polymerization of alpha-olefins comprising:

(a) a solid precursor comprising the reaction product of (i) a halogenated vanadium compound wherein the vanadium has a valence of 2 to 5; (ii) a magnesium compound; and (iii) an inside electron donor wherein the molar ratio of inside electron donor to vanadium compound is in the range of about 0.2:1 to about 2:1; the atomic ratio of magnesium to vanadium is in the range of about 3:1 to about 40:1; and the reaction product (A) is a solid having a surface area greater than about 10 square meters per gram or (B) is adsorbed on the surface of an inorganic support having a surface area greater than about 10 square meters per gram;

(b) a hydrocarbyl aluminum cocatalyst wherein the atomic ratio of aluminum to vanadium is in the range of about 2:1 to about 300:1; and (c) an outside electron donor wherein the molar ratio of outside electron donor to aluminum is in the range of about 0.02:1 to about 1:1.

18 Claims, No Drawings

VANADIUM CATALYST SYSTEMS FOR OLEFIN POLYMERIZATION

This is a continuation of parent application Ser. No. 385,665, filed July 26, 1989 and now abandoned.

TECHNICAL FIELD

This invention relates to vanadium based catalyst systems useful in the isospecific polymerization of alpha-olefins, particularly propylene homopolymers and copolymers.

BACKGROUND ART

Worldwide production of isotactic polypropylene is based on contacting propylene with a catalyst based on a solid halogenated titanium compound, or a solid solution of halogenated titanium and halogenated organo aluminum compounds, which may be fixed by physico-mechanical processes or through chemical reactions on the surface of a support of a halogenated magnesium compound, usually in the presence of an electron donor compound, i.e., a Lewis base.

Though many other metallic elements have been suggested for use in catalysts for isospecific polymerization of alpha olefins, only the titanium catalyst is currently in commercial use because of its high yield of isotactic polymers. For example, various vanadium compounds such as vanadium acetylacetonate and vanadium tetrachloride, activated with diethylaluminum chloride and other similar compounds, have been shown to catalyze the polymerization of propylene at low temperatures to low molecular weight polymers rich in syndiotactic structures, but these polymers have inferior properties and are, thus, not industrially useful. However, these vanadium catalyst are currently in commercial use for the production of random ethylene/propylene and ethylene/propylene/diene elastomers.

DISCLOSURE OF THE INVENTION

An object of this invention, therefore, is to provide a vanadium based catalyst system, which will provide a polypropylene rich in isotactic structures, exhibits a high level of productivity in the polymerization of the homopolymer and copolymers of propylene, and shows like advantages with regard to the polymerization of other alpha-olefins.

Other objects and advantages will become apparent hereinafter.

According to the present invention, a catalyst system for the polymerization of alpha-olefins has been discovered comprising (a) a solid precursor comprising the reaction product of (i) a halogenated vanadium compound wherein the vanadium has a valence of 2 to 5; (ii) a magnesium compound; and (iii) an inside electron donor wherein the molar ratio of inside electron donor to vanadium compound is in the range of about 0.2:1 to about 2:1; the atomic ratio of magnesium to vanadium is in the range of about 3:1 to about 40:1; and the reaction product (A) is a solid having a surface area greater than about 10 square meters per gram or (B) is adsorbed on the surface of an inert inorganic support having a surface area greater than about 10 square meters per gram;

(b) a hydrocarbyl aluminum cocatalyst wherein the atomic ratio of aluminum to vanadium is in the range of about 5:1 to about 300:1; and (c) an outside electron donor wherein the molar ratio of outside electron donor to aluminum is in the range of about 0.02:1 to about 1:1.

DETAILED DESCRIPTION

Vanadium compounds useful in providing the above catalyst system can be halogenated compounds of vanadium, optionally containing one or more alcoholate, carboxylate, or beta diketonate groups.

The vanadium compounds are exemplified as follows:

(i) pentavalent vanadium compounds having the formula $VX_aR_b$ wherein X is chlorine, bromine, or iodine; R is alkyl, aryl, arylalkyl, alkoxy, aryloxy, alkylaryloxy, arylalkoxy, cyclopentadienyl, indenyl, hydroindenyl, alkylcyclopentadienyl, hydridyl, carboxylate, betadiketonate, or oxygen; each X and R are the same or different; a is an integer from 1 to 5; b is an integer from 0 to 2; and $a+b=5$;

(ii) tetravalent vanadium compounds having the formula $VX_cR_dR_e^1$ wherein X and R are as above; $R^1$ is a zero valence coordinating ligand, which is an ester, a thioester, a ketone, an ether, a thioether, an amide, an amine, a nitrile, a phosphine, or carbon monoxide; each $R^1$ is the same or different; c is an integer from 1 to 4; d is an integer from 0 to 3; e is an integer from 0 to 2; and $c+d=4$;

(iii) trivalent vanadium compounds having the formula $VX_fR_gR_h^1$ wherein 1 wherein X, R, and $R^1$ are as above; f an integer from 1 to 3; g and h are integers from 0 to 2; and $f+g=3$; and (iv) divalent vanadium compounds having the formula $VX_iR_jR_k^1$ wherein X, R, and $R^1$ are as above; 1 or 2; j is 0 or 1; k is an integer from 0 to 4; and $i+j=2$.

Examples of halogenated vanadium compounds useful in this invention are $VBr_3$, $VCl_2$, $VCl_4$, $VI_2$, $VI_3$, $VOBr$, $VOBr_2$, $VOBr_3$, $VOCl$, $VOCl_2$, and $VOCl_3$; and $VR_2$, $VR_3$, $VR_4$, $VOR_3$, $VClR$, $VCl_2R$, $VCl_3R$, $VOCl_2R$ wherein R can be any of the following and each R can be the same or different:

1. $-OC_nH_{2n+1}$ wherein n = an integer from 2 to 6;

2. 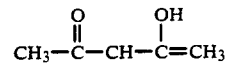

3. $-OC_6H_5$
4. $-P(C_6H_5)_3$

5. 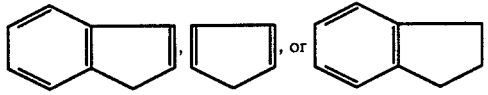

The magnesium compounds can, for example, have the formulas (i) $MgX_2$ wherein X is chlorine, bromine, or iodine and each X can be the same or different or (ii) $Mg(OR^2)$ wherein $R^2$ is a hydrocarbyl group and each $R^2$ is the same or different.

Examples of suitable magnesium compounds are magnesium chloride, magnesium bromide, magnesium diethoxide, magnesium diisopropoxide, magnesium di-n-butoxide, magnesium diphenoxide, magnesium dinaphthoxide, ethoxy magnesium isobutoxide, ethoxy magnesium phenoxide, naphthoxy magnesium isoamyloxide, ethoxy magnesium bromide, isobutoxy magnesium chloride, phenoxy magnesium iodide, cumyloxy magnesium bromide, naphthoxy magnesium chloride, magnesium dihydroxide, Mg(OH)Cl, magnesium carbonate, a magnesium salt of an organic acid, magnesium silicate, magnesium aluminate, organomagnesium compounds such as magnesium alkyls or aryls, and magnesium alcoholates or their halogenated derivatives. Mixtures of the foregoing compounds can also be used.

The reaction product of the vanadium compound, the magnesium compound, and the electron donor forms at least on the surface of the solid portion of the catalyst system. The reaction product can have an atomic ratio of magnesium to vanadium in the range of about 3:1 to about 4:1 and preferably has a molar ratio in the range of about 10:1 to about 30:1. It is preferred that at least 90 percent by weight of the reaction product is insoluble in n-heptane.

Component (a) can include, in addition to the three required components, an inert solid support such as an inorganic oxide, carbonate, sulfate, or halide of metals of Group I to IV of the Periodic Table, or mixtures thereof. The amount of support can range from about 10 percent to about 80 percent by weight based on the weight of the precursor. The support has a high surface area and porosity and is exemplified by silica and alumina. The unsupported reaction product, or the support onto which the reaction product is adsorbed, have a surface area greater than about 10 square meters per gram and preferably a surface area greater than about 100 square meters per gram. It is noted, with regard to the unsupported reaction product, that the magnesium compound may be considered to be a support although it is one of the reactants.

Component (a) can be prepared by several methods, all methods being carried out under essentially moisture and air-free conditions, preferably in an atmosphere of nitrogen or other inert gas.

One method for preparing component (a) comprises providing a solid complex between magnesium dichloride and an inner electron donor in which the molar ratio of magnesium compound to electron donor is greater than about 2:1 and is preferably in the range of about 2:1 to about 15:1. The solid complex is heated with a liquid vanadium compound or a solution of vanadium compound in an inert solvent in such a manner that a predetermined amount of the vanadium compound in its original or reacted state is adsorbed on the surface of the magnesium compound, which acts as a support. The solid product is then separated from the liquid phase under conditions such that substantially all of the unadsorbed liquid vanadium compound or unadsorbed vanadium compound in solution is extracted with n-heptane, and the adsorbed vanadium compound remains on the surface of the solid reaction product.

A second method involves grinding mixtures of a magnesium dihalide, in particular magnesium dichloride or magnesium dibromide, with an electron donor compound, optionally, in the presence of a vanadium compound, an inert solid support, or an agent which facilitates grinding such as a silicone oil or a high molecular weight hydrocarbon compound, and in treating the ground product with a vanadium compound as described above.

Where component (a) is to include a support such as silica or alumina, the support is admixed with magnesium compounds such as magnesium alkyls, magnesium alcoholates, magnesium hydroxides, magnesium salts and their halogenated derivatives, and magnesium halides under such conditions that the magnesium compounds are adsorbed onto the surface of the support. The magnesium compound/ support material is then treated with a vanadium compound as described above.

A preferred method of preparing component (a) involves solubilizing an anhydrous magnesium dihalide or magnesium dialkoxide with 3 mole equivalents or more of a compound containing active hydrogen such as an aliphatic alcohol, an alicylic alcohol, or a phenolic compound, and reacting the solution with an aliphatic, alicyclic, or aromatic acid, or its acyl halide or anhydride derivative, in a molar ratio of acid or derivative to magnesium compound of about 0.02:1 to about 0.5:1. The reaction product is then treated with a liquid vanadium compound, or a solution of a vanadium compound in an inert solvent, containing an inside electron donor wherein the molar ratio of inside electron donor to vanadium compound is in the range of about 0.05:1 to about 2:1 and is preferably in the range of about 0.2:1 to about 1:1. The solid reaction product is extracted as described above.

In the various methods of preparing component (a) when a magnesium dihalide is used, it is preferably as anhydrous as possible. However, it is feasible to employ a hydrated magnesium dihalide containing about 0.1 to about 6 moles of water per mole of magnesium dihalide.

The hydrocarbyl aluminum cocatalyst can be represented by the formula $R'_3Al$ wherein each $R'$ is an alkyl, cycloalkyl, aryl, or hydride radical; at least one $R'$ is a hydrocarbyl radical; two or three $R'$ radicals can be joined in a cyclic radical forming a heterocyclic structure; each $R'$ can be the same or different; and each $R'$, which is a hydrocarbyl radical, has 1 to 20 carbon atoms, and preferably 1 to 10 carbon atoms. Further, each alkyl radical can be straight or branched chain and each hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert butyl, pentyl, neopentyl, hexyl, 2-methylpentyl, heptyl, octyl, isooctyl, 2 ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, di-isobutylaluminum hydride, and dihexylaluminum hydride.

Any electron donor capable of forming a complex with the organometallic compound, or of entering into a substitution reaction with the organometallic compound, can be used. The electron donor can be an alcoholate, an amide, an ester, a thioester, an aldehyde, an ether, a thioether, an amide, an amine, a nitrile, a phosphine, a phosphoramide, a stilbine, an arsine, or a silicon compound including silanes and alkoxysilanes.

Esters of aromatic, aliphatic, and alicyclic carboxylic acids are preferred. They can be formed in situ by the reaction of an alcohol with these acids or its halide or anhydride derivative. Alkyl esters of benzoic, p alkoxy benzoic, p-toluic, phthalic, terephthalic, acrylic, methacrylic, pivalic, naphthoic, and crotonic acids are particularly suitable as are inorganic oxygen-containing acids such as boric and phosphoric acids.

The esters can be polycarboxylic acid esters characterized by a molecularly rigid structure wherein two ester groups are attached to adjacent carbon atoms of the molecule and lie in a single plane. Such esters include polycarboxylic acid esters containing two ester groups which are attached to (a) ortho carbon atoms of a monocyclic or polycyclic aromatic ring, each of said ester groups being further linked to a branched or unbranched chain hydrocarbon radical; (b) vicinal carbon atoms of a non-aromatic monocyclic or polycyclic ring and which lie in a syn configuration with respect to each other, each of said ester groups being further linked to a branched or unbranched chain hydrocarbon radical; or (c) vicinal double bonded carbon atoms of an unsaturated aliphatic compound and which lie in a syn configuration with respect to each other, each of said ester groups being further linked to a branched or unbranched chain hydrocarbon radical.

These polycarboxylic acid esters are derived from a suitable polycarboxylic acid and a monohydric alcohol having a linear hydrocarbon moiety which may be branched or unbranched. Examples of polycarboxylic acid esters are dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert amyl phthalate, dineopentyl phthalate, di-2-ethylhexyl phthalate, di-2-ethyldecyl phthalate, diethyl-1,2-fluorenedicarboxylate, diisopropyl-1-,2-ferrocenedicarboxylate, cis-diisobutyl-cyclobutane-1,2-dicarboxylate, endo-diisobutyl-5-norbornene-2,3-dicarboxylate, and endo-diisobutyl-bicyclo[2.2.2]oct-5-ene-2,3-dicarboxylate, diisobutyl maleate, and diisoamyl citraconate.

The silicon compounds include compounds having the formula $R''_a SiY_b X_c$ wherein $R''$ is a hydrocarbon radical having 1 to 20 carbon atoms; Y is —OR" or OCOR"; and X is hydrogen, chlorine, bromine, or iodine; each R" and Y are the same or different; a is an integer from 0 to 3; b is an integer from 1 to 4; c is 0 or 1; and $a+b+c=4$. R can be substituted or unsubstituted. Silicon compounds containing Si—O—Si groups can also be employed providing that at least one Si—O—C group is present. Examples of useful silicon compounds are diphenyldimethoxy silane, n-propyltrimethoxy silane, di-tert-butyldimethoxy silane, diphenyldiisobutoxy silane, diisobutyldimethoxy silane, and dimethyldiethoxy silane.

The inside electron donor and the outside electron donor can be the same or different. The amount of each used in the catalyst system is adjusted to provide stereoregularity in the homopolymer or copolymer being produced.

The catalyst system of the present invention is preferably employed in the polymerization of alpha-olefins having at least 3 carbon atoms and, in particular, in the synthesis of crystalline isotactic homopolymers and copolymers of propylene with one or more other alpha-olefins, preferably ethylene. Examples of other alpha-olefins which can be used in subject process are 1-butene, 1-hexene, 4-methyl-1-pentene, 1-heptene, and 1-octene. The alpha-olefins can contain from 2 to 12 carbon atoms and can be copolymerized with each other or other comonomers conventionally copolymerized with alpha-olefins. These comonomers can be conjugated or non-conjugated dienes containing 5 to 25 carbon atoms. Examples of the dienes are 1,4-pentadiene, 1,4-hexadiene, 1,5-hexadiene, dicyclopentadiene, cyclohexadiene, 1 vinyl 1-cyclopentene, and the alkylbicyclononadienes, indenes, and norbornenes. Ethylidene norbornene is an example of the latter. The non-conjugated dienes are preferred.

In the copolymer, the portion attributed to the primary comonomer, e.g., propylene, is in the range of about 80 to about 99.5 percent by weight based on the weight of the copolymer and is preferably in the range of about 90 to about 99.5 percent by weight; the portion attributed to a second comonomer, e.g., ethylene, is in the range of about 0.5 to about 20 percent by weight and is preferably in the range of about 0.5 to about 10 percent by weight; and the portion attributed to other comonomers, if any, is in the range of about 0.5 to about 20 percent by weight. All percentages are based on the weight of the copolymer. The catalyst system can also be used in the polymerization of ethylene with or without higher alpha-olefin comonomers, but, in this case, the outside electron donor is optional.

The temperature at which the polymerization is conducted can be in the range of about & minus 10° to about 200° C. and is preferably carried out in the range of about 40° C. to about 100° C. The polymerization pressure can be in the range of atmospheric pressure to about 50 kilograms per square centimeter and is preferably in the range of about 2 to about 20 kilograms per square centimeter. The polymerization can be carried out as a batch, semi-continuous, or continuous process, and the process can be a solution, slurry, or gas phase process. The process can also be conducted in liquid monomer or in an inert hydrocarbon solvent containing dissolved monomer.

The polypropylene produced with the catalyst system comprises a large fraction of isotactic polymer insoluble in boiling n-heptane, i.e., having an isotactic index greater than 90 percent. The polymer is characterized by infrared and nuclear magnetic resonance spectroscopies to contain predominantly 1,2 cis inserted monomer units and be essentially free of 2,1-cis inserted monomer units and, according to X-ray diffraction patterns and melting transition temperature, to be isotactic polypropylene.

A preferred way of preparing the polymer is in the gas phase, generally, by continuously contacting the catalyst system with various monomers in one or more fluidized bed reactors such as that described in United States Patent 4,482,687 or another conventional reactor for the gas phase production of, for example, polypropylene or propylene copolymers.

The fluidized bed, or other gas phase, reactor is operated at a temperature in the range of about 50° C. to about 150° C. and preferably at a temperature in the range of about 60° C. to about 90° C. The operating pressure is in the range of about 14 to about 46 kilograms per square centimeter or higher and preferably about 18 to about 39 kilograms per square centimeter. Using a propylene/ethylene copolymerization as an example, the partial pressure of the propylene is in the range of about 3.5 to about 42 kilogram per square centimeter and is preferably about 11 to about 35 kilograms per square centimeter. The partial pressure of ethylene is in the range of about 0.02 to about 1.8 kilograms per square centimeter and is preferably about 0.07 to about 1.1 kilograms per square centimeter. The total partial pressure of other comonomers can be about 0.04 to about 5.3 kilograms per square centimeter. The molar ratio of ethylene to propylene is about 0.005 to 0.056 and is preferably about 0.01 to 0.045. The superficial gas velocity, which can be calculated by measuring cycle gas flow, is, generally, maintained in the range of about 0.1 to about 5 feet per second and is preferably in the range of about 0.5 to about 3 feet per second. The superficial gas velocity is preferably used together with a slow transition in order to optimize the results. In other words, the ethylene concentration in the gas phase is increased slowly to the desired level for the product.

The residence time of the alpha-olefin in the reactor is in the range of about 1 to about 20 hours and preferably about 2 to about 6 hours. The velocity of the fluidizing gas is in the range of about 0.1 to about 5.0 feet per second or higher and preferably about 0.5 to about 2.0 feet per second. Hydrogen or another chain transfer agent can be used in the process. The molar ratio of hydrogen to alpha-olefin used in the fluidized bed reactor is in the range of about 0.0005:1 to about 0.2:1 and is preferably in the range of about 0.01:1 to about 0.1:1. This translates into a hydrogen partial pressure in the range of about 0.1 psi to about 200 psi and preferably about 0.5 psi to about 50 psi. The balance of the operating pressure utilized in the reactor, i.e., after the partial pressure of propylene, ethylene, and, if used, other comonomers and the hydrogen partial pressure are considered, can be made up by using an inert gas such as nitrogen.

Where it is desired to produce the propylene/ethylene copolymer only, one fluidized bed reactor is used. In the case of impact grade copolymers, a second fluidized bed reactor is needed.

In subject process, the components of the catalyst system are maintained in about the following ranges:

| Components | Molar Ratios | |
|---|---|---|
| | Broad | Preferred |
| magnesium/inside electron donor | 2:1 to 20:1 | 3:1 to 10:1 |
| aluminum/vanadium | 2:1 to 300:1 | 5:1 to 150:1 |
| inside electron donor/vanadium | 0.2:1 to 2:1 | 0.5:1 to 1:1 |
| outside electron donor/aluminum | 0.02:1 to 1:1 | 0.1:1 to 0.5:1 |
| magnesium/vanadium | 3:1 to 40:1 | 10:1 to 30:1 |

Patents and other publications mentioned in this specification are incorporated by reference herein.

The invention is illustrated by the following examples.

EXAMPLE 1

Anhydrous magnesium dichloride is heated at 350° C. under a flowing stream of hydrogen chloride gas for 30 minutes, heated for 4 hours at 400° C. under vacuum, and cooled to ambient temperature under an argon atmosphere. Five grams of this magnesium dichloride are mixed with 7.5 grams of ethyl benzoate and ground for 72 hours in a ball mill containing cylindrical ceramic elements.

The solid product obtained is suspended in 50 milliliters of n-heptane and 3 milliliters of vanadium tetrachloride and reacted for one hour with stirring. After the reaction, the solid portion is collected by filtration and washed five times with n-heptane to provide component (a), which contains 4.2 percent by weight of vanadium, 60 percent by weight of chlorine, 20 percent by weight of magnesium, and 12 percent by weight of ethyl benzoate.

A 0.1 liter glass reactor is charged with 50 milliliters of n-heptane from which the oxygen and moisture has been essentially removed. Propylene is introduced into the reactor at 50° C. and a pressure of 20 psi. Two millimols of triethylaluminum, component (b); 0.7 millimol of methyl p-toluate, component (c); and component (a) containing 0.013 millimol of vanadium are charged into the reactor.

The polymerization is carried out for one hour with the consumed propylene being continuously replenished. After the polymerization, the polymer is separated by filtration. The product contains 2.4 grams of polypropylene, 5 percent by weight of which is extractable with boiling n-heptane.

EXAMPLE 2

1.4 grams (15 millimols) of anhydrous magnesium dichloride, prepared according to Example 1, are suspended in 10 milliliters of decane. 45 millimols of 2-methylbutanol are added at 130° C. and the mixture is stirred for two hours. 0.33 gram (2.25 millimols) of phthalic anhydride is added at the same temperature and the mixture is stirred for one hour. This solution is added dropwise to 7 milliliters of vanadium tetrachloride (63 millimols) in 50 milliliters of n-decane. Then, di-s-pentylphthalate (2.97 millimols) is charged and the mixture reacted, with stirring, for 2 hours. The reaction mixture is filtered and the solid is resuspended in 220 milliliters of an n-heptane solution of vanadium tetrachloride (1.8 millimols). The suspension is agitated for 10 hours, filtered, washed with 50 milliliters of decane twice, and washed three times with 50 milliliters of n-heptane. Component (a) is then suspended in 50 milliliters of heptane, and is analyzed. Component (a) contains 1.7 percent by weight vanadium, 58 percent by weight chlorine, and 16 percent by weight magnesium.

The polymerization is carried out as in example 1 except that component (c) is 0.1 millimol of phenyltriethoxy silane and hydrogen is introduced in an amount of 35 milliliters. One hour of polymerization provides 8.3 grams of polypropylene of which 0.4 gram is extracted with boiling n-heptane.

EXAMPLE 3

Five grams of anhydrous magnesium dichloride and 7.5 grams of ethyl benzoate are ball milled as described in example 1. Then, 75 milligrams of vanadium trichloride are charged and grinding continued for 120 hours. The solid is then washed eight times with n-heptane. Component (a) contains 1.4 percent by weight vanadium, 59 percent by weight chlorine, and 19 percent by weight magnesium.

Polymerization is carried out as in example 1 except that component (a) is as above. 15 grams of polypropylene is isolated after one hour of polymerization. The amount insoluble in boiling n-heptane is 95 percent by weight.

I claim:

1. A catalyst system for the isotactic polymerization of alpha-olefins comprising:
   (a) a solid precursor comprising the reaction product of (i) a halogenated vanadium compound wherein the vanadium has a valence of 2 to 5; (ii) a magnesium compound; and (iii) an inside electron donor wherein the molar ratio of inside electron donor to vanadium compound is in the range of about 0.2:1 to about 2:1; the atomic ratio of magnesium to vanadium is in the range of about 3:1 to about 40:1; and the reaction product (A) is a solid having a surface area greater than about 10 square meters per gram or (B) is adsorbed on the surface of an inert inorganic support having a surface area greater than about 10 square meters per gram;
(b) a hydrocarbyl aluminum cocatalyst wherein the atomic ratio of aluminum to vanadium is in the range of about 2:1 to about 300:1; and
(c) an outside electron donor wherein the molar ratio of outside electron donor to aluminum is in the range of about 0.02:1 to about 1:1

2. The catalyst system defined in claim 1 wherein the reaction product contains halogen in an atomic ratio of halogen to vanadium in the range of about 10:1 to about 90:1.

3. The catalyst system defined in claim 1 wherein halogen is present in the magnesium compound.

4. The catalyst system defined in claim 1 wherein the vanadium compound contains one or more alcoholate, carboxylate, or beta-diketonate groups.

5. The catalyst system defined in claim 1 wherein the electron donors are esters.

6. The catalyst system defined in claim 1 wherein component (a) contains up to 90 percent by weight of an inert inorganic support.

7. The catalyst system defined in claim 1 wherein component (a) is adsorbed on the surface of an inert inorganic support.

8. The catalyst system defined in claim 1 wherein the vanadium compound has the formula $VX_aR_b$ wherein X is a chlorine, bromine, or iodine; R is alkyl, aryl, arylalkyl, alkoxy, aryloxy, alkylaryloxy, arylalkoxy, cyclopentadienyl, indenyl, hydroindenyl, alkylcyclopentadienyl, hydridyl, carboxylate, beta-diketonate, or oxygen; each X and R are the same or different; a is an integer from 1 to 5; b is an integer from 0 to 2; and $a+b=5$.

9. The catalyst system defined in claim 1 wherein the vanadium compound has the formula $VX_cR_dR_e^1$ wherein X is chlorine, bromine, or iodine; R is alkyl, aryl, arylalkyl, alkoxy, aryloxy, alkylaryloxy, arylalkoxy, cyclopentadienyl, indenyl, hydroindenyl, alkylcyclopentadienyl, hydridyl, carboxylate, beta-diketonate, or oxygen; $R^1$ is a zero valence coordinating ligand, which is an ester, a thioester, a ketone, an ether, a thioether, an amide, an amine, a nitrile, a phosphine, or carbon monoxide; each X, R, and $R^1$ are the same or different; c is an integer from 1 to 4; d is an integer from 0 to 3; e is an integer from 0 to 2; and $c+d=4$.

10. The catalyst system defined in claim 1 wherein the vanadium compound has the formula $VX_fR_gR^1_h$ wherein X is chlorine, bromine, or iodine; R is alkyl, aryl, arylalkyl, alkoxy, aryloxy, alkylaryloxy, arylalkoxy, cyclopentadienyl, indenyl, hydroindenyl, alkylcyclopentadienyl, hydridyl, carboxylate, beta-diketonate, or oxygen; $R^1$ is a zero valence coordinating ligand, which is an ester, a thioester, a ketone, an ether, a thioether, an amide, an amine, a nitrile, a phosphine, or carbon monoxide; each X, R, and $R^1$ are the same or different; f is an integer from 1 to 3; q and h are integers from 0 to 2; and $f+q=3$.

11. The catalyst system defined in claim 1 wherein the vanadium compound has the formula $VX_iR_jR_k^1$ wherein X is chlorine, bromine, or iodine; R is alkyl, aryl, arylalkyl, alkoxy, aryloxy, alkylaryloxy, arylalkoxy, cyclopentadienyl, indenyl, hydroindenyl, alkylcyclopentadienyl, hydridyl, carboxylate, beta-diketonate, or oxygen; $R^1$ is a zero valence coordinating ligand, which is an ester, a thioester, a ketone, an ether, a thioether, an amide, an amine, a nitrile, a phosphine, or carbon monoxide; each X, R, and $R^1$ are the same or different; i is 1 or 2; j is 0 or 1; k is an integer from 0 to 4; and $i+j=2$.

12. The catalyst system defined in claim 1 wherein the inside electron donor and/or the outside electron donor are an alcoholate, an amide, an ester, a thioester, an aldehyde, an ether, a thioether, an amide, an amine, a nitrile, a phosphine, a phosphoramide, a stilbine, an arsine, or a silicon compound.

13. The catalyst system defined in claim 1 wherein the inside electron donor and/or the outside electron donor are esters of aromatic, aliphatic, or alicyclic mono- or poly-carboxylic acids.

14. The catalyst system defined in claim 1 wherein the outside electron donor is a silicon compound having the formula $R''_aSiY_bX_c$ wherein R'' is a hydrocarbon radical having 1 to 20 carbon atoms; Y is —OR'' or —OCOR''; and X is hydrogen, chlorine, bromine, or iodine; each R'' and Y are the same or different; a is an integer from 0 to 3; b is an integer from 1 to 4; c is 0 or 1; and $a+b+c=4$.

15. The catalyst system defined in claim 1 wherein the solid precursor is the reaction product of vanadium tetrachloride, magnesium dichloride, phthalic anhydride, and di-s-pentylphthalate; the cocatalyst is triethylaluminum; and the outside electron donor is phenyltriethoxy silane.

16. The catalyst system defined in claim 1 wherein the solid precursor is the reaction product of vanadium trichloride, magnesium dichloride, and ethyl benzoate; the cocatalyst is triethylaluminum; and the outside electron donor is methyl p-toluate.

17. A catalyst system for the polymerization of alpha-olefins comprising:
(a) a solid precursor comprising the reaction product of (i) a halogenated vanadium compound wherein the vanadium has a valence of 2 to 5; (ii) a magnesium compound; and (iii) an inside electron donor wherein the molar ratio of inside electron donor to vanadium compound is in the range of about 0.2:1 to about 2:1; the atomic ratio of magnesium to vanadium is in the range of about 3:1 to about 40:1; and the reaction product is a solid having a surface area greater than about 10 square meters per gram;
(b) a hydrocarbyl aluminum cocatalyst wherein the atomic ratio of aluminum to vanadium is in the range of about 2:1 to about 300:1; and
(c) an outside electron donor wherein the molar ratio of outside electron donor to aluminum is in the range of about 0.02:1 to about 1:1.

18. A catalyst system for the polymerization of alpha-olefins comprising:
(a) a solid precursor comprising the reaction product of (i) a halogenated vanadium compound wherein the vanadium has a valence of 2 to 5; (ii) a magnesium compound; and (iii) an inside electron donor wherein the molar ratio of inside electron donor to vanadium compound is in the range of about 0.2:1 to about 2:1; the atomic ratio of magnesium to vanadium is in the range of about 3:1 to about 40:1; and the reaction product is adsorbed on the surface of an inert inorganic support having a surface area greater than about 10 square meters per gram;
(b) a hydrocarbyl aluminum cocatalyst wherein the atomic ratio of aluminum to vanadium is in the range of about 2:1 to about 300:1; and
(c) an outside electron donor wherein the molar ratio of outside electron donor to aluminum is in the range of about 0.02:1 to about 1:1.

* * * * *